United States Patent [19]

Takahashi

[11] Patent Number: 5,539,173
[45] Date of Patent: Jul. 23, 1996

[54] ELECTRIC DISCHARGE MACHINING FLUID

[75] Inventor: Nobuyuki Takahashi, Yokohama, Japan

[73] Assignee: Sodick Co., Ltd., Yokohama, Japan

[21] Appl. No.: 144,528

[22] Filed: Nov. 2, 1993

[30] Foreign Application Priority Data

Nov. 2, 1992 [JP] Japan .................................. 4-315522

[51] Int. Cl.$^6$ ..................................................... B23H 1/08
[52] U.S. Cl. .................................... 219/69.14; 219/69.17; 252/572
[58] Field of Search ........................... 219/69.14, 69.17; 252/74, 572

[56] References Cited

U.S. PATENT DOCUMENTS

| | | | |
|---|---|---|---|
| 4,251,706 | 2/1981 | Frei et al. | 219/69.14 |
| 4,362,989 | 12/1982 | Frei | 324/71 CP |
| 4,373,127 | 2/1983 | Haskett et al. | 219/69.15 |
| 4,375,588 | 3/1983 | Frei | 219/69.17 |
| 4,392,042 | 7/1983 | Inoue | 219/69.14 |
| 4,404,448 | 9/1983 | Bommeli | 219/69.16 |
| 4,551,602 | 11/1985 | Inoue et al. | 219/69.14 |
| 4,870,243 | 9/1989 | Wilson et al. | 219/69.14 |
| 4,952,768 | 8/1990 | Mohri et al. | 219/69.15 |
| 5,130,039 | 7/1992 | Bloink et al. | 252/74 |
| 5,143,708 | 9/1992 | Nakazawa et al. | 252/572 |
| 5,189,276 | 2/1993 | Magara | 219/69.14 |
| 5,252,249 | 10/1993 | Karachi et al. | 252/74 |
| 5,315,087 | 5/1994 | Itoh | 219/69.14 |

FOREIGN PATENT DOCUMENTS

| | | |
|---|---|---|
| 548932 | 6/1993 | European Pat. Off. . |
| 3631331 | 4/1987 | Germany ................... 219/69.14 |
| 52-26357 | 7/1977 | Japan . |
| 54-0718 | 7/1979 | Japan . |
| 55-27810 | 7/1980 | Japan . |
| 55-500783 | 10/1980 | Japan . |
| 61-71920 | 4/1986 | Japan . |
| 61-11281 | 4/1986 | Japan . |
| 62-239 | 1/1987 | Japan . |
| 62-24916 | 2/1987 | Japan . |
| 2-83119 | 3/1990 | Japan ................... 219/69.14 |
| 3-62733 | 6/1991 | Japan . |
| 3-277421 | 12/1991 | Japan . |
| 787731 | 12/1957 | United Kingdom ........... 219/69.14 |
| 828336 | 2/1960 | United Kingdom . |

OTHER PUBLICATIONS

Journal of the Japan Soc. of Electrical–machining Engrs., vol. 25/No. 49 Jul. 1991, pp. 47–60 "Mori et al.".

*Primary Examiner*—Geoffrey S. Evans
*Attorney, Agent, or Firm*—Marks & Murase

[57] ABSTRACT

An EDM fluid comprising in mixture, a liquid dielectric and a powder, including polycrystalline silicon and a small amount of inorganic oxide, provided for forming a smooth workpiece surface having a carbon-iron-silicon alloy. The powder is preferably present in an amount ranging from about 0.1 to 5.0 wt. % of the liquid dielectric. The inorganic oxide may include silicon oxide, iron oxide, and calcium oxide. Further, a concentrate made by kneading the powder with an oil comprising mainly an aromatic hydrocarbon having a density of more than 0.93 g/milliliter at 15° C. added to the dielectric, whereby the powder is dispersed uniformly.

29 Claims, 3 Drawing Sheets

*FIG. 5*
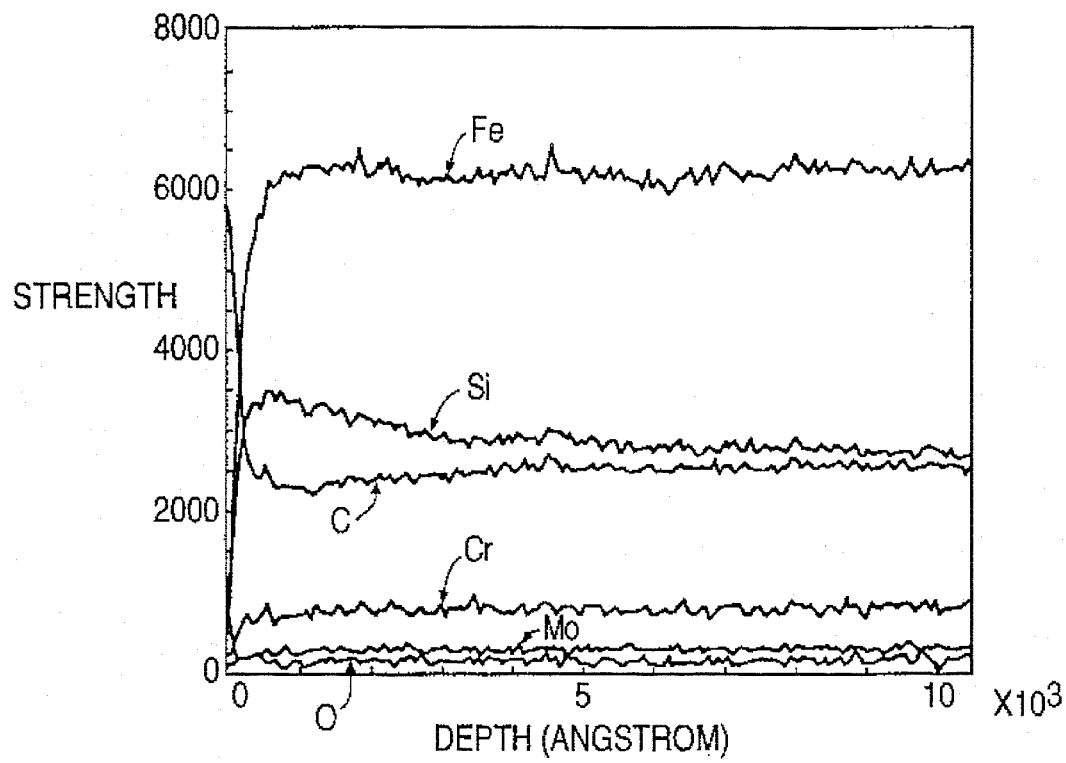
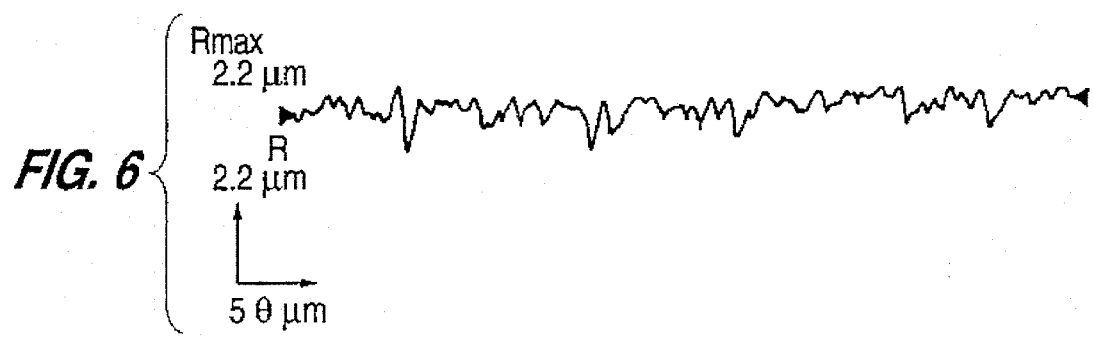
*FIG. 6*
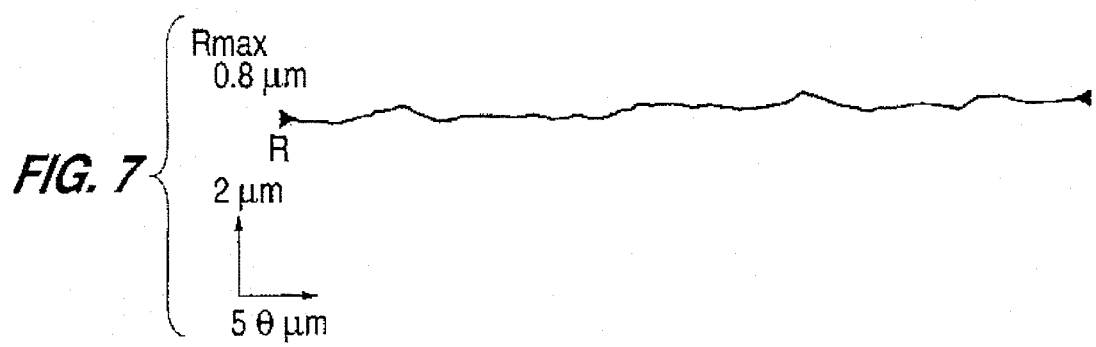
*FIG. 7*

ELECTRIC DISCHARGE MACHINING FLUID

FIELD OF THE INVENTION

The present invention relates generally to an electric discharge machining ("EDM") fluid and, more particularly, to an EDM fluid for finish machining which is produced by admixing a powder with a liquid dielectric.

BACKGROUND OF THE INVENTION

In electric discharge machining, a liquid dielectric, such as oil or water, is generally used as an EDM fluid. It is also known to use EDM fluid which is produced by admixing conductive or semiconductive powder into the liquid dielectric. The liquid dielectric mixed with the conductive powder is used for machining a workpiece by electrical discharges through the mixed liquid and conductive powder, and there have been proposals thereon as follows.

Japanese Patent Publication No. 52-26357, published on Jul. 13, 1977, discloses a method of adding conductive powder to the liquid dielectric supplied into the gap between a tool electrode and a workpiece and of controlling the amount of the powder according to a desired machining over-size. The conductive powders to be added are produced by mixing metal powder or graphite powder having a particle size of 5 to 10 micrometers with machined chips such as graphite and carbon black of 10 to 100 angstroms. The mixed conductive powders are admixed to the liquid dielectric to a density from 0.05 to 15 g/liter.

Japanese Patent Publication No. 55-27810, published on Jul. 23, 1980, discloses a method of admixing metal powders, susceptible of vaporization (i.e., with high vapor pressure), with the liquid dielectric to be supplied to the machining gap. The metal powders are easily vaporized at a high temperature of electric discharges and the resultant metal vapor becomes dispersed in the liquid dielectric increasing conductivity thereof to thereby render it easier to induce electric discharges when applying voltage pulses across the machining gap. Metal powders of cadmium, indium, zinc, magnesium, tin, lead, and bismuth are used.

Japanese Laid-Open Patent Publication No. 55-500783, published on Oct. 16, 1980, discloses that a liquid dielectric mixed with conductive powder such as metal powder or graphite of up to 5 micrometers particle size at 0.001 to 1% by volume increases removal rate with a reduction of electrode wear rate and an improvement in the machined surface.

Japanese Patent Publication No. 54-20718, published on Jul. 25, 1979, discloses an electric discharge machining method in which a paste produced by kneading a mixture of a powder mainly comprising conductive powder and the liquid dielectric, is disposed in the desired machining gap. As conductive powders, graphite, brass, tungsten, silver tungsten, silver, copper, copper tungsten, are used. This publication also discloses that a paste may be produced by kneading a mixture of conductive powder and a magnetic powder of barium ferrite and high carbon steel with a small amount of liquid dielectric.

Japanese Laid-Open Patent Publication No. 2-83119, published on Mar. 23, 1990, discloses a method of forming a surface layer on a workpiece by means of electrical discharges in which the material for forming the surface layer is disposed between a tool electrode and the workpiece in powder form. The EDM fluid includes 20 g/liter silicon having an average particle size of about 20 to 40 micrometers mixed with the liquid dielectric. Further, as the powder materials, tungsten carbide and semiconductor such as zirconium boride, and others are presented.

SUMMARY OF THE INVENTION

An object of the present invention is to provide an EDM fluid and a method of electric discharge machining in which a fine and remarkably smooth surface of the workpiece is formed.

It is another object of the invention to provide an EDM fluid and a method for electric discharge machining in which a powder is distributed uniformly in a liquid dielectric to thereby machine the workpiece into a desired configuration with a uniform high machining accuracy even if the tool electrode is large.

Additional objects, advantages and novel features of the invention will be set forth in part in the description which follows, and in part will become apparent to those skilled in the art upon reading this description or practicing the invention. The objects and advantages of the invention may be realized and attained by means of the instrumentalities and combinations particularly pointed out in the appended claims.

A general aspect of the present invention is the provision of an improved EDM fluid comprising a mixture of a liquid dielectric and a powder of silicon, the powder of silicon mainly comprising polycrystalline silicon and a small amount of inorganic oxide. Preferably, the powder is present in an amount from 0.1 to 5.0 wt. %, more preferably, from 0.2 to 3.0 wt. % of the liquid dielectric. Additionally, the inorganic oxide may preferably include silicon oxide, iron oxide and/or calcium oxide, preferably present in an amount from 0.01 to 10 wt. % of the silicon. Further, the silicon preferably has an average particle size of from about 0.1 to 100 micrometers.

In accordance with an aspect of the present invention, the EDM fluid is preferably produced by kneading the powder with a liquid kneading medium dissolvable in the liquid dielectric to make a liquid concentrate and dispersing this liquid concentrate in the liquid dielectric. Preferably, the liquid kneading medium includes oils mainly composed of aromatic hydrocarbons having a density of more than 0.93 g/milliliter at 15° C.

Another aspect of the present invention is the provision of a method for machining a workpiece by electric discharges using a tool electrode, including the steps of admixing a powder of silicon, mainly comprising polycrystalline silicon, and a small amount of inorganic oxide, into a liquid dielectric to form a finishing EDM fluid, the powder being present in an amount from 0.1 to 5.0 wt. % of the liquid dielectric, and supplying the finishing EDM fluid into a machining gap between the workpiece and the tool electrode during finish machining.

BRIEF DESCRIPTION OF THE DRAWINGS

The present invention will be more apparent from the following detailed description, when taken in conjunction with the accompanying drawings, in which;

FIG. 5 is a diagram showing the results of an Auger electron spectroscopic analysis of a workpiece surface after machining with an EDM fluid according to the present invention;

FIG. 6 is a diagram showing the roughness of a workpiece surface after machining; and FIG. 7 is a diagram showing the roughness of a workpiece surface after machining with an EDM fluid according to the present invention.

DETAILED DESCRIPTION OF THE PREFERRED EMBODIMENTS

Figure 1:
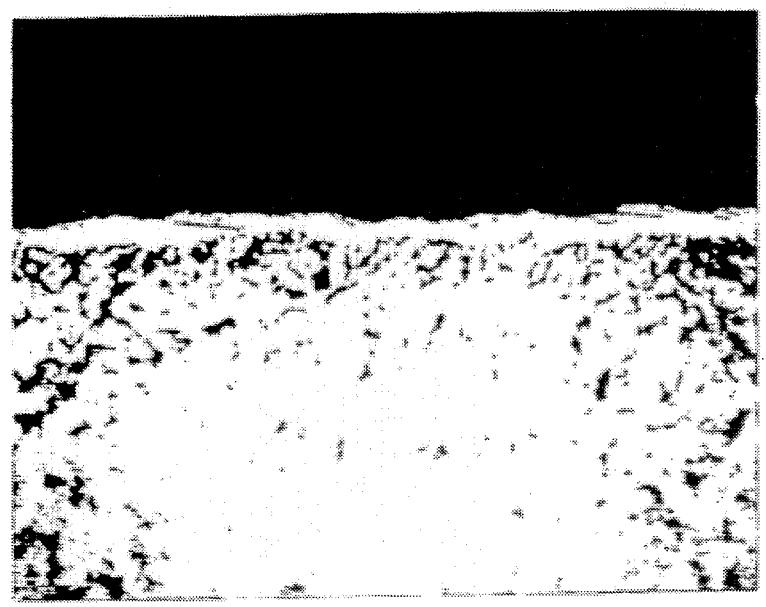
FIG. 1 is a micrograph showing the cross-section of the workpiece surface after the machining process.

The present invention is based in part on experimental studies of methods for forming a smooth workpiece surface, such as may be required after finish machining, taking full advantage of the characteristics of the metal structure of the workpiece. The invention is based in part on the discovery that components of a specific semiconductive powder dispersed in a liquid dielectric will react with other components (for example, components in the liquid dielectric and in the workpiece) to form a smooth workpiece surface having a desired metal structure.

More specifically, the present invention is based in part on the experimental discovery that:

(a) Even if silicon powder is thermally fused by electric discharges, it is improbable that the powder will adhere to the workpiece as a coating.

(b) When performing electric discharge machining using a liquid dielectric, where polycrystalline silicon powder and a small amount of additional powder having specific components are added, a workpiece of α-iron based material forms a surface having an alloy of silicon and components not contained in the additional powder.

(c) The alloy is a carbon-iron-silicon alloy and the workpiece surface of the α-iron based material having the alloy is remarkably uniform.

(d) The uniform surface formed in the workpiece is not related to certain physical operations, such as the relative approach movement between a tool electrode and the workpiece.

Based in part upon the discovery of these phenomena, an EDM fluid according to the present invention is provided in which a powder of polycrystalline silicon and a small amount of inorganic oxide is uniformly dispersed in a liquid dielectric.

Silicon

The silicon which is used in preparing an EDM fluid according to the present invention is preferably polycrystalline silicon. Even though noncrystalline, polycrystalline and single crystalline silicons are known, polycrystalline silicon has been selected as the most advantageous form for forming a smooth surface of the workpiece.

However, all the silicon powder used need not be in the form of polycrystalline silicon. It has been found that EDM fluid according to the present invention will achieve the noted advantages even if small amounts of additional silicons (besides the polycrystalline silicon), such as noncrystalline silicon and others, are included. If such additional silicons are included, they are preferably limited to not more than 2 to 3 wt. % of the polycrystalline silicon. However, in some cases, such silicons may be present in amounts of up to about 20 wt. % of the polycrystalline silicon, depending upon electrical discharge machining conditions. Therefore, polycrystalline silicon should be present in amounts of at least about 80 wt. % of the silicon powder.

The silicon powder, mainly comprising polycrystalline silicon, should also have appropriate particle size and particle size distribution so as to be dispersed in the liquid dielectric. If the powder particles are excessively small, they are likely to cohere and settle. On the other hand, if the powder particles are too large, they may disturb the stability of the machining process, or introduce a short circuit between a tool electrode and a workpiece, resulting in damage to the workpiece. It has been found that an average particle size of about 0.01 to 100 micrometers is preferable for use according to the present invention. Since the silicon particle surface may be oxidized if produced by a grinding process (which impairs the particle conductivity), it is preferable for the particles, if produced by grinding, to be processed in a nitrogen atmosphere or in oil to prevent such oxidation and to an average particle size in the range of from about 0.1 to 80 micrometers. An average size of 1.0 to 50 micrometers is even more preferable.

In industrial practice, powders which are fined by grinding are not conveniently classified. With regard to particle size distribution, in order to ensure a smooth workpiece surface, it is preferred that at least about ⅓rd of the silicon powder should have a particle size in the range of from about 1.0 to 50 micrometers.

Inorganic Oxide

The inorganic oxide which may be used in preparing an EDM fluid according to the present invention may be an oxide of metal elements or an oxide of nonmetal elements for forming a surface of an α-iron based workpiece having a carbon-iron-silicon alloy. In addition, the inorganic oxide may comprise one or several oxides. The inorganic oxide may comprise a powder mixed together with the polycrystalline silicon, or a powder which is separate therefrom.

The inorganic oxide preferably comprises silicon oxide, iron oxide and/or calcium oxide. In this case, it has been found that, when a small amount of such inorganic oxide is included in the powder, a smooth workpiece surface can be obtained under a wide variety of machining condition.

Further, as to the amount of inorganic oxide to be used, a small amount, effective to realize the above-mentioned workpiece surface finish by means of electric discharge machining when the polycrystalline silicon powder and the inorganic oxide powder is dispersed in the liquid dielectric, is acceptable. More specifically, the amount of inorganic oxide used is preferably in the range of from about 0.01 to 10 wt. % of the silicon, which, as explained above, is primarily (at least 80%) polycrystalline silicon.

Liquid Dielectric

The liquid dielectric in which the polycrystalline silicon and the inorganic oxide are dispersed may be either a water based dielectric or an oil based dielectric. As the water based dielectric, water or water including water-soluble substances, such as water-soluble oligomer and water-soluble high polymer, is generally used. As the oil based dielectric, a mineral oil is generally used while oil-soluble matter may be dissolved therein. However, oil composed of components with a molecular structure having a number of carbon atoms is preferable to obtain the advantages of the present invention. For example, oil composed of aromatic hydrocarbons, or oil to which aromatic hydrocarbons have been added, may be used. However, it is preferable to limit the amount of aromatic hydrocarbons, both to avoid unpleasant odors and to maintain a higher flash point.

Preferably, in preparing the EDM fluid, powder in the range of from about 0.1 to 5.0 wt. % of the liquid dielectric, is admixed to the liquid dielectric, and more preferably in the range of from about 0.2 to 3.0 wt. %. As long as the above-mentioned mix ratio teachings are observed, when preparing an EDM fluid, the fluid will be within the scope of the present invention. In that regard, it is noted that after the EDM fluid is supplied to the machining gap (formed between the tool electrode and the workpiece) during the machining process, some of the powder may settle out. However, as long as the preferred mix ratio is present in the fluid as supplied to the machining zone during machining, the advantages of the present invention will be realized.

As long as it does not impair the advantages of the invention, any normal additive, such as machining efficiency improver, dispersant, redispersion promoter, antioxidant, antifoamer, etc., may be added to the EDM fluid.

Dispersing Method

Any means for dispersing the powder of the polycrystalline silicon and the inorganic oxide in the liquid dielectric can be employed. A dispersant, such as a surface active agent, may be used. Particularly, ethylene oxide colloidal dispersant has been found to be effective.

Further, the invention may include an advantageous method for dispersing the powder uniformly. In accordance with this method, the powder and a liquid kneading medium, dissolvable in the liquid dielectric, are kneaded together by a shearing force to make a liquid concentrate. Then, the liquid concentrate is dissolved in the liquid dielectric.

The amount of powder to be mixed with the liquid kneading medium may be in the range of from about 10 to 80 wt. % of the total liquid concentrate, though the precise amount depends on the particle size and the particle size distribution.

While any liquid dielectric may serve as a liquid kneading medium, when an oil based dielectric is used, an oil or combination of oils, mainly composed of aromatic hydrocarbons, is preferable. More preferably, an oil or oils comprising mainly aromatic hydrocarbons having a high density, e.g., oil having a density of 0.93 g/milliliter at 15° C., and a kinematic viscosity of more than 100 cSt at 40° C., is used, as it will prevent the powder from settling by weakening the mutual cohesive forces thereof. In this case, it is not necessary that the oil dielectric and the oil kneading medium have the same kinematic viscosity.

Aromatic hydrocarbons may be used as a major component of the kneading medium despite the unpleasant odor and low flash point associated with such materials, as the total amount of kneading medium is small compared to the total amount of liquid dielectric used. Preferably, the kneading medium comprises an oil composition including CA(aromatic), CN(naphthene) and CP(paraffin) components, wherein the CA and CN components are present in an amount ranging from about 30%–80% of the total (i.e., CA+CN+CP), and more preferably in the range of from about 50%–80% of the total.

Any means for kneading the powder and the liquid kneading medium by shearing effect can be used. Kneading devices are well known and are generally used in processing high-molecular compounds, and in producing paints and paper. For example, in processing high-molecular compounds, a roll, a kneader, a Banbury mixer and an extruder are used, having a mechanism for kneading high-molecular compounds by using high shearing forces directed in either two or three dimensions.

The concentrate is a liquid rather than a paste, even when the above-mentioned high-density oil is used, though its kinematic viscosity depends on the amount of powder used. It is found that when preparing an EDM fluid using this concentrate, the powder will not form a mass in the liquid dielectric, thereby retaining the powder material in powder form, and consequently will not uselessly expand the machining gap during the machining process.

Electric Discharge Machining Method

Use of an EDM fluid according to the present invention permits the formation of a very smooth surface in the workpiece, having the above-mentioned metal compositions, while employing EDM conditions generally used for finishing the workpiece. For example, the following EDM conditions for finish machining power may be used:

| | |
|---|---|
| Polarity | Workpiece is poled positive |
| ON pulse time | 1 to 20 microseconds |
| OFF pulse time | 2 to 80 microseconds |
| Current value | 0.1 to 10 amperes (in short circuit) |

In addition, there are no limitations on the EDM apparatus in terms of the fluid supply device used for carrying out the method according to the present invention.

EXAMPLE

An EDM fluid was prepared using the following powder material:

| | |
|---|---|
| Polycrystalline silicon (particle size of 1 to 80 micrometers) | 95.5 wt-% |
| Silicon dioxide ($SiO_2$) | 3.0 wt-% |
| Iron oxide ($Fe_2O_3$) | 1.0 wt-% |
| Calcium oxide ($CaO_2$) | 0.5 wt-% |

A powder comprising 500 g of this composition, 20 g of ethylene oxide colloidal dispersant, and 5 g of 2,6-di-tert-butyl, were added to 500 g of aromatic hydrocarbon, having a kinematic viscosity of 930 cSt at 40° C. and a density of 0.98 g/milliliter at 15° C., to make a concentrate. The materials were gradually mixed at 60° C. by stirring for one hour. Then, the mixture was kneaded by means of two rolls, having different rotation speeds, until it became a homogeneous concentrate. The concentrate was a liquid. The liquid concentrate was added to a mineral oil based dielectric, having a kinematic viscosity of 2 cSt at 40° C. with 1 wt. % of the dielectric, and was stirred for 30 minutes to prepare the EDM fluid.

Using this EDM fluid, electric discharge machining was performed under the following circumstances:

| | |
|---|---|
| Electric discharge machine model: | Sodick A35, MARK 21 Controller |
| Tool Electrode: | 30 mm φ |
| Workpiece material: (Japanese Industrial Standards) | SKD-61 |
| Electrical conditions: | |
| Polarity | Workpiece poled positive |
| Pulse On Time | 4 microseconds |
| Current | 5 amperes (in short circuit) |

Results:

FIG. 1 is a micrograph with a magnification of X1000 showing the cross-section of the workpiece surface when the electrical discharge machining was performed on the same workpiece using the same mineral oil based dielectric under the same EDM condition as used in the above example, but where no powder was added to the dielectric. In FIG. 1, a layer is formed on the workpiece surface; however, it is thin and uneven.

Figure 2:
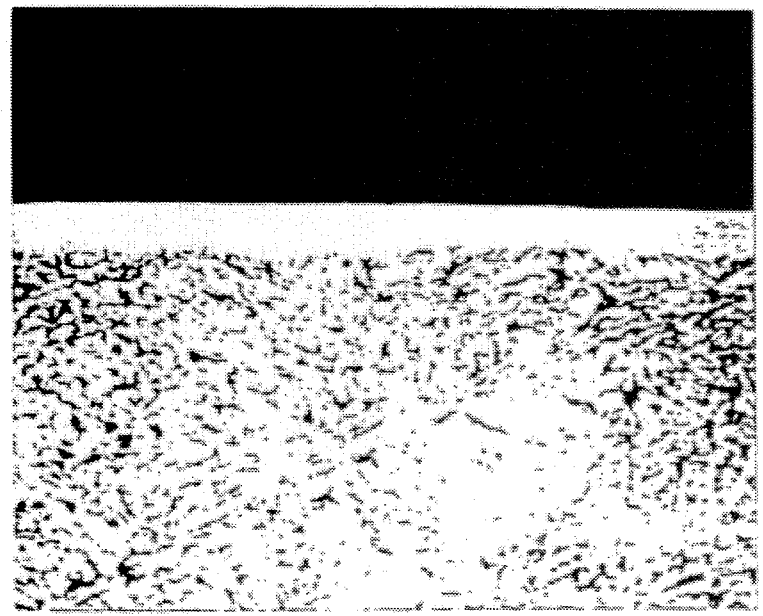
FIG. 2 is a micrograph showing the cross-section of the workpiece surface after the machining process with an EDM fluid according to the present invention.

FIG. 2 is a micrograph with a magnification of X1000 showing the cross-section of the workpiece surface finished using the conditions set forth in the above example. In FIG. 2, a relatively fine, thick and very smooth layer is formed on the workpiece surface.

In addition, the X-ray analysis of the workpiece surface was carried out as follows:

| X-ray Source: | |
|---|---|
| Rad-C system | |
| Cathode | Cu |
| Voltage | 50 KV |
| Current | 200 mA |
| Measuring Conditions: | |
| Time constant | 1.0 sec |
| Scanning range | 20 to 80 degrees |

According to the X-ray analysis, α-iron was detected in a workpiece before the machining process. While α-iron, ε-iron and a carbon(C)-iron(Fe)-silicon(Si) alloys were detected in the workpiece surface after the machining process. Therefore, it was found that part of α-iron in the workpiece surface had been shifted to ε-iron due to heat transformation, and a carbon-iron-silicon alloy had been produced when using an EDM fluid according to the present invention. Further, when such an alloy is produced, a fine, thick and smooth layer is formed on the workpiece surface, as shown in FIG. 2.

Figure 3:
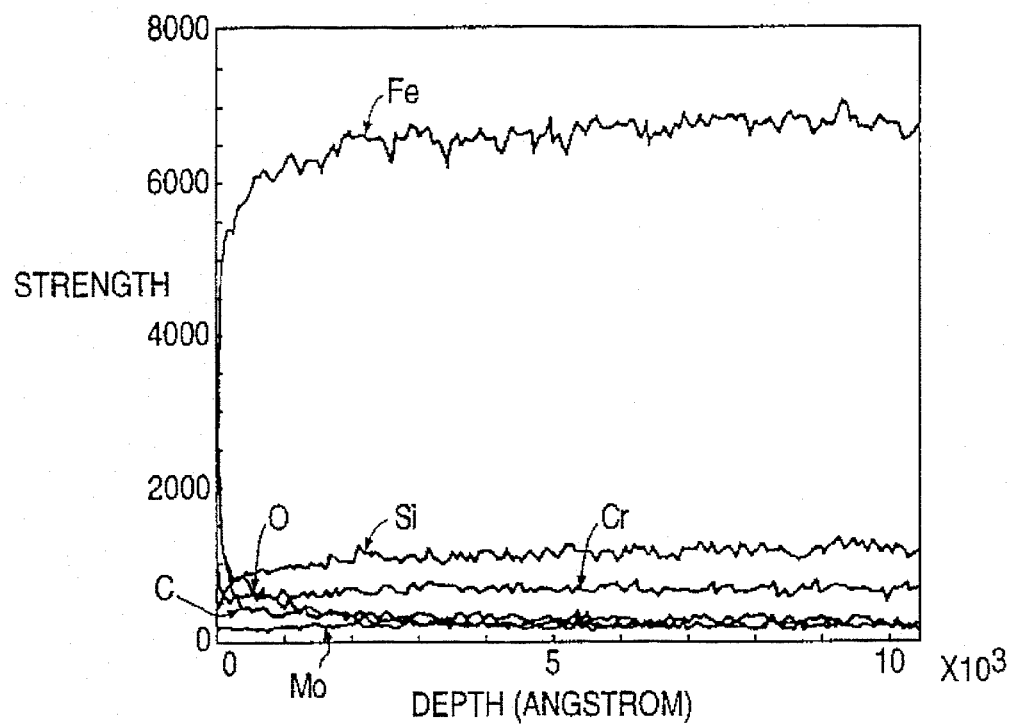
FIG. 3 is a diagram showing the results of an Auger electron spectroscopic analysis of a workpiece surface before machining.

Additionally, workpiece surfaces before and after the machining process were analyzed by Auger electron spectroscopic analysis. FIG. 3 is a diagram depicting the results of the Auger electron spectroscopic analysis of the workpiece surface before the machining process. In FIG. 3, the point "0" on the abscissa represents the top surface of the workpiece and the points "5" and "10" represent surface depths of 5000 and 10000 angstroms, respectively. Further, the ordinate represents the strength of elements. As shown in FIG. 3, a certain amount of iron(Fe), carbon(C), and oxygen(O), as well as a small amount of chromium(Cr), silicon(Si) and molybdenum(Mo), are detected on the top surface before the machining process. The reason why oxygen(O) is detected is assumed to be due to the presence of oxides on the top surface. However, in the range from the top surface to a surface depth of 5000 angstroms, the amount of iron(Fe) suddenly increases, while that of carbon(C) and oxygen(O) suddenly decreases.

Figure 4:
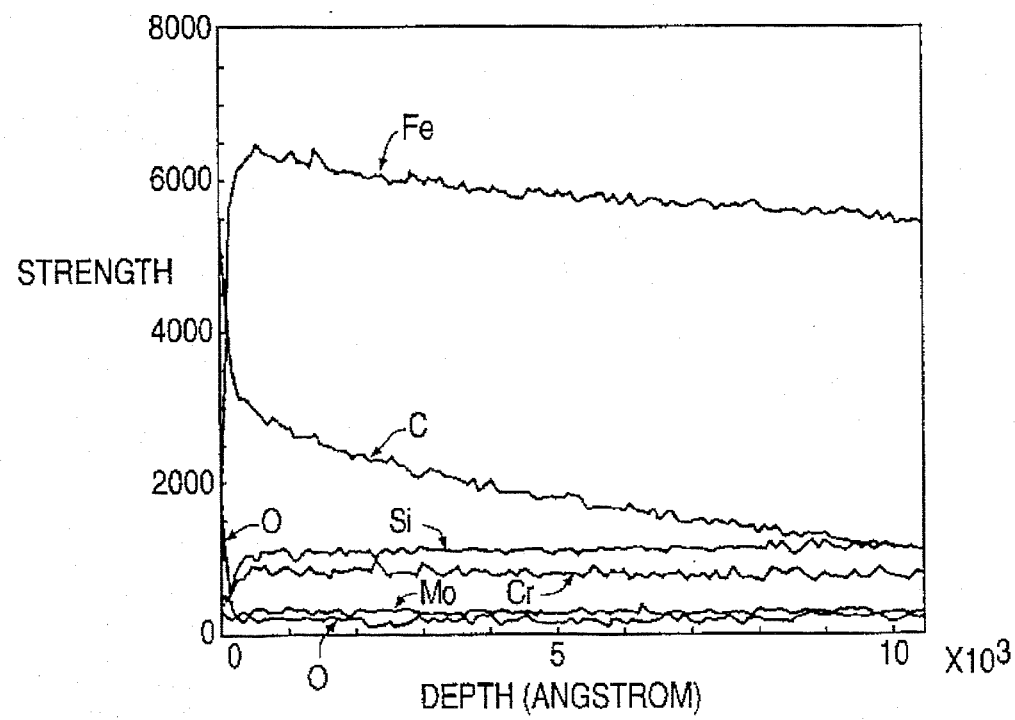
FIG. 4 is a diagram showing the results of an Auger electron spectroscopic analysis of a workpiece surface after machining.

FIG. 4 is a diagram depicting the results of an Auger electron spectroscopic analysis of the workpiece surface after the machining process with a mineral oil based dielectric not using the powder according to the present invention. It may be recognized from FIG. 4 that carbon(C) has entered into the workpiece during the machining process.

FIG. 5 is a diagram depicting the results of an Auger electron spectroscopic analysis of the workpiece surface after the machining process using an EDM fluid according to the present invention. As shown in FIG. 5, a large amount of carbon(C) and a small amount of iron(Fe) are detected on the top surface after the machining process. And in the range from the top surface to a surface depth of 5000 angstroms, carbon(C) suddenly decreases while iron(Fe) suddenly increases and silicon(Si) correspondingly increases.

FIGS. 6 and 7 are diagrams showing the measured roughnesses of the workpiece surfaces shown in micrographs of FIGS. 1 and 2, respectively. Referring to FIGS. 6 and 7, it is found that the workpiece surface finished with the EDM fluid of the invention is very smooth.

The foregoing example has been presented for purposes of illustration and description. It is not intended to be exhaustive or to limit the invention to the precise form disclosed, and obviously many modifications and variations are possible in light of the above teaching. It is intended that the scope of the invention be defined by the claims appended hereto.

I claim:

1. An electric discharge machining fluid comprising, in mixture, a liquid dielectric and a powder of silicon and a relatively small amount of inorganic oxide, more than half of said silicon being in the form of polycrystalline silicon.

2. The electric discharge machining fluid according to claim 1, wherein said powder is present in an amount in the range of from about 0.1 to 5.0 wt. % of said liquid dielectric.

3. The electric discharge machining fluid according to claim 1, wherein at least about 80 wt. % of said silicon is in the form of polycrystalline silicon.

4. The electric discharge machining fluid according to claim 1, wherein said inorganic oxide is selected from the group comprising one or more of silicon oxide, iron oxide, and calcium oxide.

5. The electric discharge machining fluid according to claim 4, wherein said inorganic oxide is present in an amount in the range of from about 0.01 to 10 wt. % of said silicon.

6. The electric discharge machining fluid according to claim 1, wherein said silicon powder has an average particle size in the range of from about 0.1 to 100 micrometers.

7. The electric discharge machining fluid according to claim 1, wherein said silicon powder has an average particle size in the range of from about 1.0 to 50 micrometers.

8. The electric discharge machining fluid according to claim 1, wherein said mixture is formed from a liquid concentrate produced by kneading said powder with a liquid kneading medium dissolvable in said liquid dielectric and dispersing said liquid concentrate in said liquid dielectric.

9. The electric discharge machining fluid according to claim 8, wherein said liquid kneading medium comprises oils mainly composed of aromatic hydrocarbons having a density of more than 0.93 g/milliliter at 15° C.

10. An electric discharge machining electric discharge machining method for machining a workpiece by electric discharges across a machining gap formed between said workpiece and a tool electrode comprising steps of:

admixing a powder of silicon and inorganic oxide with a liquid dielectric to form a finishing electric discharge machining fluid, more than half of said silicon being polycrystalline silicon; and supplying said finishing electric discharge machining fluid to said machining gap during finish machining of said workpiece.

11. The method according to claim 10, further comprising the step of providing said powder in an amount ranging from about 0.1 to 5.0 wt. % of said liquid dielectric.

12. The method according to claim 10, further comprising the step of providing at least about 80 wt. % of said silicon in the form of polycrystalline silicon.

13. The method according to claim 10, wherein said inorganic oxide is selected from the group comprising one or more of silicon oxide, iron oxide, and calcium oxide.

14. The method according to claim 13, wherein said inorganic oxide is present in an amount in the range of from about 0.01 to 10 wt. % of said silicon.

15. The method according to claim 10, wherein said silicon powder has an average particle size in the range of from about 0.1 to 100 micrometers.

16. The method according to claim 10, wherein said admixing step comprises the steps of kneading said powder with a liquid kneading medium dissolvable in said liquid dielectric to make a liquid concentrate and dispersing said liquid concentrate in said liquid dielectric.

17. The method according to claim 16, wherein said liquid kneading medium includes oils mainly composed of aromatic hydrocarbons having a density of more than 0.93 g/milliliter at 15° C.

18. A method of making an electric discharge machining electric discharge machining fluid comprising the steps of
   selecting a liquid dielectric;
   selecting a powder of silicon and an inorganic oxide, at least about half of said silicon being in the form of polycrystalline silicon; and
   admixing said liquid dielectric with said powder of silicon and inorganic oxide.

19. The method according to claim 18, wherein at least about 80 wt. % of said silicon is in the form of polycrystalline silicon.

20. The method according to claim 18, wherein during the step of admixing, said powder is provided in the range of from about 0.1 to 5.0 wt. % of said liquid dielectric.

21. The method according to claim 18, wherein said inorganic oxide is selected from the group comprising one or more of silicon oxide, iron oxide, and calcium oxide.

22. The method according to claim 21, wherein said inorganic oxide is present in an amount in the range of from about 0.01 to 10 wt. % of said silicon.

23. The method according to claim 18, wherein said silicon powder has an average particle size in the range of from about 0.1 to 100 micrometers.

24. The method according to claim 18, wherein said silicon powder has an average particle size in the range of from about 1.0 to 50 micrometers.

25. The method according to claim 18, further comprising the steps of kneading said powder with a liquid kneading medium dissolvable in said liquid dielectric to thereby make a liquid concentrate, and dispersing said liquid concentrate in said liquid dielectric.

26. The method according to claim 25, wherein said liquid kneading medium comprises an oil, mainly composed of aromatic hydrocarbons having a density of more than 0.93 g/milliliter at 15° C.

27. The method according to claim 18, wherein during the step of admixing said powder is present in the range of from about 0.2 to 3.0 wt. % of said liquid dielectric.

28. The method according to claim 25, wherein the powder is present in the range of from about 10 to 80 wt. % of the total weight of the liquid concentrate.

29. The method according to claim 26, wherein said oil has a kinematic viscosity of more than 100 cSt at 40° C.

* * * * *